United States Patent [19]

Iafrate et al.

[11] Patent Number: 5,387,997
[45] Date of Patent: Feb. 7, 1995

[54] OPTICAL MODULATOR BASED ON PIEZOELECTRICALLY DRIVEN ANISOTROPIC OPTICAL ABSORPTION

[75] Inventors: Gerald J. Iafrate, Raleigh, N.C.; Mitra Dutta, Matawan; Hongen Shen, Howell, both of N.J.; Michael A. Stroscio, Durham, N.C.; Arthur Ballato, Oceanport, N.J.

[73] Assignee: The United States of America as represented by the Secretary of the Army, Washington, D.C.

[21] Appl. No.: 159,902

[22] Filed: Nov. 29, 1993

[51] Int. Cl.⁶ .............................................. G02F 1/015
[52] U.S. Cl. ..................................... 359/248; 257/14; 359/245; 359/323
[58] Field of Search ............... 359/237, 238, 245, 248, 359/276, 285, 286, 323; 257/14, 15, 18, 22, 94, 96, 97

[56] References Cited

U.S. PATENT DOCUMENTS

| | | | |
|---|---|---|---|
| 5,101,294 | 3/1992 | Jain et al. | 359/285 |
| 5,159,420 | 10/1992 | Grudkowski et al. | 257/14 |
| 5,166,766 | 11/1992 | Grudkowski et al. | 257/15 |
| 5,221,989 | 6/1993 | Stappaerts et al. | 359/323 |

OTHER PUBLICATIONS

"Optical Anisotropy In GaAs/Al$_x$Ga$_{1-x}$ Multiple Quantum Wells Under Thermally Induced Uniaxial Strain," by Shen et al, Physical Reviews B, vol. 47, pp. 993-996, May 15, 1993.

"Normal Incidence High Contrast Multiple Quantum Well Light Modulator Based on Polarization Rotation," by Shen et al, Applied Physical Letters, vol. 62, No. 23, pp. 2908-2910, Jun. 7, 1993.

*Primary Examiner*—John D. Lee
*Attorney, Agent, or Firm*—Michael Zelenka; William H. Anderson

[57] ABSTRACT

An optic modulator having a transparent piezoelectric substrate, an active multiple quantum well (MQW) epilayer with bottom electrical contacts bonded to the substrate, wherein the substrate is cut such that its thermal expansion coefficient is matched or roughly matched to that of the MQW epilayer in the direction parallel to the long axes of the bottom contacts and so that the piezoelectrically-active direction of the substrate is normal to the long axes of the bottom contacts. In order to control the bias of the MQW epilayer a transparent contact is disposed over the MQW epilayer. In operation, the piezoelectric substrate, when activated, will displace an anisotropic strain on the MQW epilayer which will break the rotational symmetry in the plane of the MQW. This will result in anisotropic mixing of the heavy and light holes in the MQW epilayer and thus, will result in an anisotropic excitonic absorption of light normal to the MQW epilayer.

6 Claims, 2 Drawing Sheets

OPTICAL MODULATOR BASED ON PIEZOELECTRICALLY DRIVEN ANISOTROPIC OPTICAL ABSORPTION

GOVERNMENT INTEREST

The invention described herein may be made, used, sold, and/or licensed by, or on behalf of, the Government of the United States of America without the payment to us of any royalties thereon.

RELATED APPLICATIONS

The present application is related to an application assigned to the same assignee, the United States of America, as represented by the Secretary of the Army, which is entitled, "Uniaxially Strained Semiconductor Multiple Quantum Well Device Using Direction-Dependent Thermal Expansion Co-efficients In A Host Substrate," Ser. No. 08/154,901, filed Nov. 19, 1993.

FIELD OF THE INVENTION

The present invention relates in general to optical modulators based on quantum well technology and more particularly relates to such modulators which are driven by quantum well heterostructures having an anisotropic strain placed on them.

BACKGROUND OF THE INVENTION

Semiconductor multiple quantum well (MQW) modulators operating with incident light normal to the plane of the device are of considerable interest because they are the fundamental elements for spatial light modulators, and have the potential for being high speed, high dynamic range devices integrable with detector and control electronic circuits. Prior research on normal incidence multiple quantum well light modulators has concentrated on amplitude modulation, relying on a sufficient difference in the absorption coefficient between the on/off states at the operating wavelength to achieve useful contrasts. Such changes in the absorption coefficient have typically been effected by means of the quantum confined Stark effect (QCSE), Wannier Stark localization, or photoinduced excitonic absorption saturation. Unfortunately, thickness constraints due to growth considerations, coupled with the limitation that the maximum obtainable change in the excitonic absorption due to line broadening is $\sim 2 \times 10^4$ cm$^{-1}$, prevents the contrast ratio in a normal incidence MQW light modulator from exceeding a value of $\sim$10:1. This on-/off ratio can be improved considerably by incorporation of the modulator structure within an asymmetric Fabry-Perot (ASFP) cavity which has a 100:1 contrast in a reflection electro-optic absorption modulator and a 27:1 contrast in an all-optical modulator. Conversely, optical modulators utilizing polarization rotation, such as liquid crystal and magneto-optic devices, have achieved significantly higher contrast ratios ($>10^4$:1), but they are hampered by poor high frequency performance.

SUMMARY OF THE INVENTION

Accordingly, it is an object of the present invention to provide for an optic modulator that is tuned by piezoelectric tuning of anisotropic absorption of light normal to the plane of a multiple quantum well heterostructure.

This and other objects of the invention are achieved by providing for an optic modulator comprised of a transparent piezoelectric substrate, an active multiple quantum well (MQW) epilayer with bottom electrical contacts bonded to the substrate, wherein the substrate is cut such that its thermal expansion coefficient is matched or roughly matched to that of the MQW epilayer in the direction parallel to the long axes of the bottom contacts and so that the piezoelectrically-active direction of the substrate is normal to the long axes of the bottom contacts. In order to control the bias of the MQW epilayer a transparent contact is disposed over the MQW epilayer. In operation, the piezoelectric substrate, when activated, will displace an anisotropic strain on the MQW epilayer which will break the rotational symmetry in the plane of the MQW. This will result in anisotropic mixing of the heavy and light holes in the MQW epilayer and thus, will result in an anisotropic excitonic absorption of light normal to the MQW epilayer.

BRIEF DESCRIPTION OF THE DRAWINGS

These and other features of the present invention will be more clearly understood in light of the following Detailed Description and the Figures wherein.

DETAILED DESCRIPTION OF THE INVENTION

Figure 1:
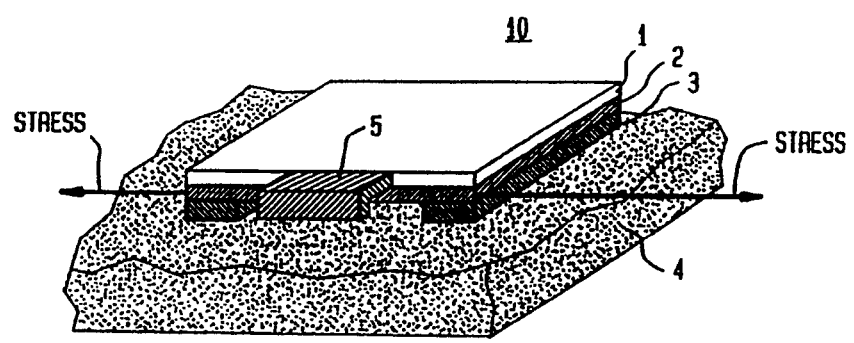
FIG. 1 is a planar illustration of a unit cell of an optic modulator according to the present invention.

Now referring to the Figures, there is shown in FIG. 1 a planar illustration of a unit cell 10 of an optic modulator according to the present invention. As shown, the unit cell 10 is bonded to a transparent piezoelectric substrate 4 and comprises bottom electrical contacts 3, an active MQW epilayer 2 connected to the bottom electrical contacts 3, a transparent top electrode disposed on top of the MQW epilayer 1, and a side electrical contact 5. The piezoelectric substrate is cut such that its thermal expansion coefficient is matched or roughly matched to that of the MQW epilayer in a direction parallel to the long axes of the bottom contacts and such that the piezoelectrically active direction of the piezoelectric substrate is normal to the long axes of the bottom contacts. The side electrical contact only contacts the transparent top electrical contact and serves as a lead. The active MQW epilayer is nominally a p-i-(MQW)-n structure grown with conventional epitaxy techniques, such as molecular beam epitaxy, and processed with conventional lift-off techniques. An example, of a MQW epilayer which is suitable for the present invention is a heterostructure wherein the i region consists of approximately 100 periods of 100 Å GaAs/60 Å Al$_{0.2}$Ga$_{0.8}$As multiple quantum wells. The electrical circuitry used to drive the present invention is conventional circuitry and therefore, need not be elaborated on here as those skilled in the art will readily be able to develop any suitable circuitry given this disclosure.

Figure 2:
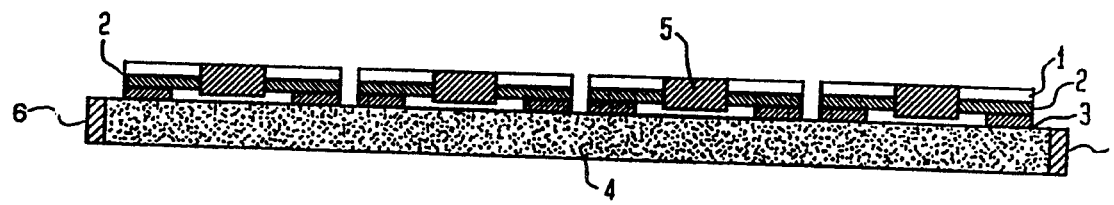
FIG. 2 is a cross-section illustration of an array of the elements shown in FIG. 1.
Figure 3:
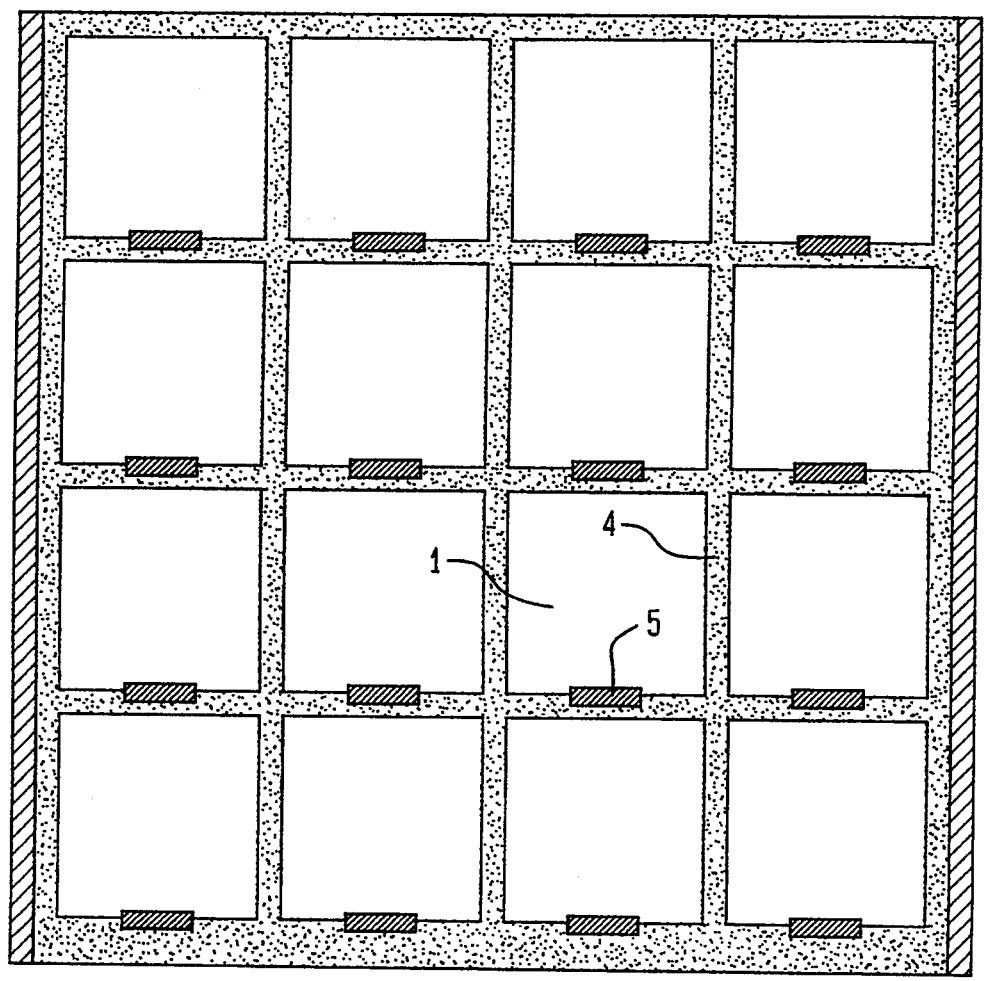
FIG. 3 is a top view illustration of the array shown in FIG. 2.

In operation, the application of an external voltage across the electrodes 6 (FIG. 2) on the piezoelectric substrate produces an anisotropic strain in each unit cell 10. This anisotropic strain causes a mixing of the heavy and light holes in the MQW epilayer which, in turn, causes an anisotropic exciton absorption of light normal to the MQW epilayer. In this embodiment, the resulting change in absorption is then addressed electrically with the side contacts connected to the transparent top electrical contact 1. However, the change in absorption may also be addressed optically by analyzing the transmitted light intensity exiting the transparent piezoelectric substrate at the positions of all of the unit cells 10. An empirical explanation of the anisotropic absorption of incident light caused by this anisotropic strain is given in such articles written by some of the inventors herein as, "Optical Anisotropy in GaAs/Al$_x$Ga$_{1-x}$ Multiple Quantum Wells Under Thermally Induced Uniaxial Strain," by Shen et at, *Physical Reviews B*, Vol. 47, pg. 993–996, May 15, 1993 and "Normal Incidence High Contrast Multiple Quantum Well Light Modulator Based on Polarization Rotation," by Shen et al, *Applied Physical Letters*, Vol. 62, no. 23, pgs 2908–2910, Jun. 7, 1993, both of which are incorporated herein by reference.

With the present invention, an optic modulator may be formed in a transmission mode, as described above or an optic modulator may be formed in a reflective configuration coupled with a beam splitter. Of course, given the present disclosure, those skilled in the art would be readily able to modify the elements of the present invention to arrive at any number of configurations. Accordingly, the inventors do not wish to be limited by the present description, but only by the appended claims.

What is claimed is:

1. An optic modulator comprising:
    a piezoelectric substrate having a thermal expansion coefficient and a piezoelectrically-active direction;
    bottom contact means bonded to the piezoelectric substrate, said bottom contact means having a lengthwise axis;
    a multiple quantum well heterostructure displaced on the bottom contact means, said multiple quantum well heterostructure having a thermal expansion coefficient; and
    means to electrically bias the piezoelectric substrate;
    wherein the piezoelectric substrate is formed such that its thermal expansion coefficient is matched to that of the MQW epilayer in the direction parallel to the lengthwise axis of the bottom contact means and so that the piezoelectrically-active direction of the substrate is normal to the lengthwise axis of the bottom contact means, and wherein when the piezoelectric substrate is biased, an anisotropic strain is displaced along said multiple quantum well heterostructure whereby an anisotropic absorption of light is induced in said multiple quantum well heterostructure.

2. The optic modulator of claim 1 wherein the bottom contact means comprises at least two conductive contacts.

3. The optic modulator of claim 2 wherein the multiple quantum well heterostructure is a p-i-n semiconductor heterostructure wherein the i layer includes a multiple quantum well.

4. The optic modulator of claim 3 wherein the i layer includes 100 periods of 100 Å GaAs/60 Å Al$_{0.2}$Ga$_{0.8}$As multiple quantum wells.

5. The optic modulator of claim 2 further comprising transparent top contact means disposed on the multiple quantum well heterostructure and side electrical contact means disposed on a side of the transparent top contact means.

6. The optic modulator of claim 1 wherein a plurality of multiple quantum well heterostructures are disposed on the piezoelectric substrate in a predetermined pattern.

* * * * *